United States Patent
Pappachan et al.

(10) Patent No.: US 11,157,623 B2
(45) Date of Patent: Oct. 26, 2021

(54) TECHNOLOGIES FOR SECURE HARDWARE AND SOFTWARE ATTESTATION FOR TRUSTED I/O

(71) Applicant: Intel Corporation, Santa Clara, CA (US)

(72) Inventors: Pradeep M. Pappachan, Hillsboro, OR (US); Reshma Lal, Hillsboro, OR (US); Bin Xing, Hillsboro, OR (US); Siddhartha Chhabra, Portland, OR (US); Vincent R. Scarlata, Beaverton, OR (US); Steven B. McGowan, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/280,351

(22) Filed: Feb. 20, 2019

(65) Prior Publication Data

US 2019/0278911 A1 Sep. 12, 2019

Related U.S. Application Data

(63) Continuation of application No. 14/974,960, filed on Dec. 18, 2015, now Pat. No. 10,248,791.

(Continued)

(51) Int. Cl.
*G06F 21/57* (2013.01)
*G06F 21/60* (2013.01)

(52) U.S. Cl.
CPC ............ *G06F 21/57* (2013.01); *G06F 21/602* (2013.01)

(58) Field of Classification Search
CPC ...................................................... G06F 21/57
See application file for complete search history.

(56) References Cited

U.S. PATENT DOCUMENTS 5,987,557 A * 11/1999 Ebrahim ............. G06F 12/1483
                                                    710/200
6,549,972 B1 * 4/2003 Berstis ..................... H04L 63/02
                                                    710/311

(Continued)

FOREIGN PATENT DOCUMENTS

CN    107851150 A    3/2018
CN    111079168 A    4/2020

(Continued)

OTHER PUBLICATIONS

International Search Report and Written Opinion for PCT Application PCT/US2016/038395, dated Sep. 28, 2016, 3 pages.

(Continued)

*Primary Examiner* — Bradley W Holder
(74) *Attorney, Agent, or Firm* — Jaffery Watson Mendonsa & Hamilton LLP (57) ABSTRACT

Technologies for trusted I/O attestation and verification include a computing device with a cryptographic engine and one or more I/O controllers. The computing device collects hardware attestation information associated with statically attached hardware I/O components that are associated with a trusted I/O usage protected by the cryptographic engine. The computing device verifies the hardware attestation information and securely enumerates one or more dynamically attached hardware components in response to verification. The computing device collects software attestation information for trusted software components loaded during secure enumeration. The computing device verifies the software attestation information. The computing device may collect firmware attestation information for firmware loaded in the I/O controllers and verify the firmware attestation information. The computing device may collect application attestation information for a trusted application that uses the (Continued)

trusted I/O usage and verify the application attestation information. Other embodiments are described and claimed.

7 Claims, 6 Drawing Sheets

Related U.S. Application Data (60) Provisional application No. 62/194,763, filed on Jul. 20, 2015, provisional application No. 62/195,148, filed on Jul. 21, 2015, provisional application No. 62/198,779, filed on Jul. 30, 2015.

(56) References Cited

U.S. PATENT DOCUMENTS

| | | | | |
|---|---|---|---|---|
| 6,647,494 | B1* | 11/2003 | Drews | H04L 41/082 713/1 |
| 6,704,871 | B1* | 3/2004 | Kaplan | G06F 21/72 713/192 |
| 6,816,963 | B1* | 11/2004 | Krithivas | G06F 9/4416 710/10 |
| 6,823,457 | B1* | 11/2004 | Berstis | H04L 12/4625 380/262 |
| 8,176,336 | B1* | 5/2012 | Mao | G06F 21/57 713/189 |
| 9,307,411 | B2* | 4/2016 | Ekberg | G09C 1/00 |
| 2006/0031598 | A1* | 2/2006 | Blanchard | G06F 9/4411 710/15 |
| 2008/0077994 | A1 | 3/2008 | Comlekoglu | |
| 2008/0209203 | A1 | 8/2008 | Haneda | |
| 2009/0064292 | A1 | 3/2009 | Carter et al. | |
| 2009/0328164 | A1* | 12/2009 | Sunder | G06F 21/57 726/5 |
| 2010/0031047 | A1 | 2/2010 | Coker | |
| 2011/0161675 | A1 | 6/2011 | Diard | |
| 2012/0023568 | A1* | 1/2012 | Cha | H04L 63/0807 726/10 |
| 2012/0260345 | A1 | 10/2012 | Quinn et al. | |
| 2012/0324214 | A1* | 12/2012 | Asokan | H04L 9/3247 713/100 |
| 2013/0159726 | A1* | 6/2013 | McKeen | G06F 21/53 713/189 |
| 2014/0006776 | A1* | 1/2014 | Scott-Nash | G06F 21/57 713/156 |
| 2014/0130124 | A1* | 5/2014 | Ekberg | H04L 9/0877 726/2 |
| 2014/0157404 | A1* | 6/2014 | Chhabra | G06F 21/54 726/22 |
| 2014/0173756 | A1* | 6/2014 | Chhabra | G06F 21/10 726/29 |
| 2014/0189246 | A1* | 7/2014 | Xing | G06F 21/53 711/135 |
| 2014/0258733 | A1* | 9/2014 | Scott-Nash | G06F 9/45558 713/190 |
| 2015/0178226 | A1 | 6/2015 | Scarlata | |
| 2016/0099811 | A1* | 4/2016 | Hawblitzel | H04L 9/0825 713/176 |

FOREIGN PATENT DOCUMENTS

| | | |
|---|---|---|
| EP | 2889800 | 7/2015 |
| EP | 2889800 A1 | 7/2015 |
| EP | 3326099 A1 | 5/2018 |
| EP | 3582129 A1 | 12/2019 |
| EP | 3805968 A1 | 4/2021 |
| WO | 2011/101795 | 8/2011 |
| WO | 2011101795 A1 | 8/2011 |
| WO | 2001109722 A2 | 9/2011 |
| WO | 2011109772 A2 | 9/2011 |
| WO | 2013147872 A1 | 10/2013 |
| WO | 2012138551 A1 | 1/2021 |

OTHER PUBLICATIONS

Sadeghi, et al., "Property-based Attestation for computing platforms: caring about properties, not mechanisms"; Published in Proceeding NSPW '04 Proceedings of the 2004 workshop on new security paradigms, pp. 67-77; Nova Scotia, Canada—Sep. 20-23, 2004, ACM Digital Library (2004).

Li, et al., "A trusted Computing Environment Model in Cloud Architecture"; Published in 2010 International Conference on Machine Learning and Cybernetics; Date of Conference: Jul. 11-14, 2010, IEEE Xplore (2010).

Extended European Search Report for EP Application 16828187.1, dated Feb. 2, 2019, 5 pages.

Extended European Search Report for EP Application 1918977.6, dated Sep. 3, 2019, 6 pages.

Extended European Search Report for EP Application 16828190.5, dated Feb. 19, 2019, 5 pages.

Extended European search report in European patent application No. 16828190.5, dated Feb. 19, 2019 (5 pages).

Non Final Office Action issued for U.S. Appl. No. 16/260,850, dated Dec. 30, 2019, 16 pages.

Final Office Action for U.S. Appl. No. 16/260,850, dated Jun. 18, 2020, 19 pages.

Extended European Search Report for EP Application No. 20211698.4, dated Jan. 26, 2021, 5 pages.

Office Action for CN Application No. 201680042368.1, dated Apr. 6, 2021, 6 pages.

* cited by examiner

\_SB - System bus
  PCI0 - PCI bus
    USB0 - USB Controller device                                802
      _ADR - Indicates address of the controller on the PCI bus
      _TCI - Indicates TIO Controller ID and Number of CIDs allocated to the controller
      RHUB - Root Hub device
        _ADR - Must be 0 for Root Hub device
        HCP1 - Root Hub Port device 1 (Not user-visible)
          _ADR - Address of Port
          _UPC - USB Port Capabilities
        HCP2 - Root Hub Port device 2 (Not user-visible, non-removable device)
          _ADR - Address of Port
          _UPC - USB Port Capabilities
          UDEV - USB device attached to port
            _ADR - Device Slot assigned to the device, or 0 if dynamic
            _TPE - TIO Secure Endpoint Assignment
        HCPn - Root Hub Port device n (User-visible)    804
          _ADR - Address of Port
          _UPC - USB Port Capabilities
          _PLD - Port Location Descriptor, required if a USB port is user visible

FIG. 8

TECHNOLOGIES FOR SECURE HARDWARE AND SOFTWARE ATTESTATION FOR TRUSTED I/O

CROSS-REFERENCE TO RELATED APPLICATIONS

The present application is a continuation application of U.S. application Ser. No. 14/974,960, entitled "TECHNOLOGIES FOR SECURE HARDWARE AND SOFTWARE ATTESTATION FOR TRUSTED I/O," which was filed on Dec. 18, 2015, and which claimed priority under 35 U.S.C. § 119(e) to U.S. Provisional Patent Application Ser. No. 62/194,763, entitled "CRYPTOGRAPHIC PROTECTION OF I/O DATA FOR DMA CAPABLE I/O CONTROLLERS," which was filed on Jul. 20, 2015, to U.S. Provisional Patent Application Ser. No. 62/195,148, entitled "CRYPTOGRAPHIC PROTECTION OF I/O DATA FOR DMA CAPABLE I/O CONTROLLERS," which was filed on Jul. 21, 2015, and to U.S. Provisional Patent Application Ser. No. 62/198,779, entitled "TECHNOLOGIES FOR HARDWARE AND SOFTWARE ATTESTATION FOR TRUSTED I/O," which was filed on Jul. 30, 2015.

BACKGROUND

Current processors may provide support for a trusted execution environment such as a secure enclave, also known as an architectural enclave. Secure enclaves include segments of memory (including code and/or data) protected by the processor from unauthorized access including unauthorized reads and writes. In particular, certain processors may include Intel® Software Guard Extensions (SGX) to provide secure enclave support.

In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Trusted I/O (TIO) technology enables an application to send and/or receive I/O data securely to/from a device. In addition to the hardware that produces or consumes the I/O data, several software and firmware components in the I/O pipeline might also process the data.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
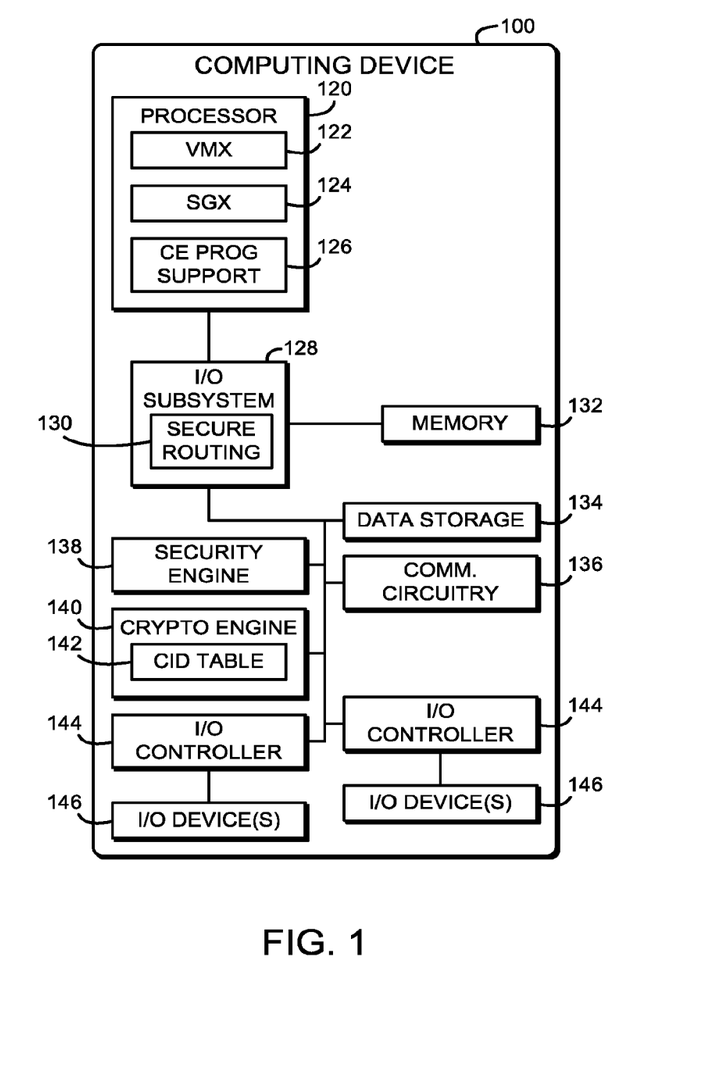
FIG. 1 is a simplified block diagram of at least one embodiment of a computing device for secure hardware and software attestation.

Referring now to FIG. 1, in an illustrative embodiment, a computing device 100 for secure hardware and software attestation includes, among other components, a processor 120, main memory 132, a hardware cryptographic engine 140, and one or more I/O controllers 144 in communication with one or more I/O devices 146. In use, the cryptographic engine 140 provides on-the-fly encryption and decryption of data transferred via direct memory access (DMA) transactions between the platform I/O controllers 144 and the memory 132. Each DMA transaction is tagged with a channel ID (CID) representing a flow of data associated with a particular I/O device 146 or set of I/O devices 146. The cryptographic engine 140 uses the CID to reliably identify transactions that must be protected, retrieve the corresponding encryption keys, and perform appropriate cryptographic operations on the DMA data.

A trusted application executed by the computing device 100 may use the cryptographic engine 140 to perform hardware cryptographic trusted I/O (TIO) with one or more I/O devices 146. As further described below, hardware, firmware, and software entities of the computing device 100 attest to their identities in a secure and verifiable manner in order for the trusted application to have the assurance that the data it receives or sends is processed only by the software and hardware entities that the trusted application trusts. TIO attestation is the mechanism of reporting information about the hardware, firmware, and software components of the computing device 100 that are used by the trusted application for a specific trusted I/O usage. The TIO attestation information may be verified by the trusted application, by a local verifier, or by a remote verifier. The TIO attestation and verification techniques performed by the computing device 100 provides assurances of authenticity (that the attestation information originates from trusted sources on the computing device 100), locality (that the attestation information accurately describes the hardware and software components on the local computing device 100), and configuration (that the attestation information describes the configuration and connection between the trusted software components on the computing device 100 for the specific usage). Further, the computing device 100 provides mechanisms that allow for updates to attestation information on the computing device 100. Thus, attestation and verification performed by the computing device 100 may protect trusted applications from various threats such as prevention of the discovery of platform components, modification of TIO software components, loading of wrong versions of software components, and prevention of secure connections between the software and hardware components.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 128, a memory 132, a data storage device 134, and communication circuitry 136. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 may include hardware virtualization support 122, secure enclave support 124, and crypto engine programming support 126.

The hardware virtualization support 122 supports virtualized execution of operating systems, applications, and other software by the computing device 100. The hardware virtualization support 122 may include virtual machine extensions (VMX) support by providing two modes of execution: VMX-root mode and VMX non-root mode. The VMX-root mode allows executing software to have broad control of the computing device 100 and its hardware resources. Conversely, a hypervisor, virtual machine monitor (VMM), or host operating system (OS) may execute in VMX-root mode. The VMX non-root mode restricts access to certain hardware instructions while still implementing the ordinary ring/privilege system of the processor 120. One or more guest OSs may execute in the VMX non-root mode. Those guest OSs may execute in ring zero, similar to being executed without virtualization. The hardware virtualization support 122 may also support extended page tables (EPT), which may be embodied as hardware-assisted second-level page address translation. The hardware virtualization support 122 may be embodied as, for example, Intel® VT-x technology.

The secure enclave support 124 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 132. The secure enclave support 124 may be embodied as a set of processor instruction extensions that allows the processor 120 to establish one or more secure enclaves in the memory 132. For example, the secure enclave support 124 may be embodied as Intel® Software Guard Extensions (SGX) technology.

The crypto engine programming support 126 allows the processor 120 to program the cryptographic engine 140 to provide cryptographic protection of I/O data. In particular, the processor 120 may enable or disable encryption for certain I/O channels, and may securely provide encryption keys to the cryptographic engine 140. The crypto engine programming support 126 may be embodied as one or more specialized processor instructions (e.g., the instructions EBINDTIO, UNWRAP, or other instructions) and associated hardware, microcode, firmware, or other components of the processor 120.

The memory 132 may be embodied as any type of volatile or non-volatile memory or data storage capable of performing the functions described herein. In operation, the memory 132 may store various data and software used during operation of the computing device 100 such as operating systems, applications, programs, libraries, and drivers. The memory 132 is communicatively coupled to the processor 120 via the I/O subsystem 128, which may be embodied as circuitry and/or components to facilitate input/output operations with the processor 120, the memory 132, and other components of the computing device 100. For example, the I/O subsystem 128 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. Additionally or alternatively, in some embodiment the memory 132 may be communicatively coupled to the processor 120 via an integrated memory controller of the processor 120. The I/O subsystem 128 may further include secure routing support 130. The secure routing support 130 includes hardware support to ensure I/O data cannot be misrouted in the fabric 128 under the influence of rogue software. The secure routing support 130 may be used with the cryptographic engine 140 to provide cryptographic protection of I/O data. In some embodiments, the I/O subsystem 128 may form a portion of a system-on-a-chip (SoC) and be incorporated, along with the processor 120, the memory 132, and other components of the computing device 100, on a single integrated circuit chip.

The data storage device 134 may be embodied as any type of device or devices configured for short-term or long-term storage of data such as, for example, memory devices and circuits, memory cards, hard disk drives, solid-state drives, or other data storage devices. In some embodiments, the data storage device 134 may be used to store the contents of one or more secure enclaves. When stored by the data storage device 134, the contents of the secure enclave may be encrypted to prevent unauthorized access.

The communication circuitry 136 of the computing device 100 may be embodied as any communication circuit, device, or collection thereof, capable of enabling communications between the computing device 100 and other remote devices over a network. The communication circuitry 136 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may include a security engine 138, which may be embodied as any hardware component(s) or circuitry capable of providing security-related services to the computing device 100. In particular, the security engine 138 may include a microprocessor, microcontroller, or other embedded controller capable of executing firmware and/or other code independently and securely from the processor 120. Thus, the security engine 138 may be used to establish a trusted execution environment separate from code executed by the processor 120. The security engine 138 may communicate with the processor 120 and/or other components of the computing device 100 over a dedicated bus, such as a host embedded controller interface (HECI). The security engine 138 may also provide remote configuration, control, or management of the computing device 100. In the illustrative embodiment, the security engine 138 is embodied as a converged security engine (CSE) incorporated in a system-on-a-chip (SoC) of the computing device 100. In some embodiments, the security engine 138 may be embodied as a manageability engine, an out-of-band processor, a Trusted Platform Module (TPM), or other security engine device or collection of devices. Further, in some embodiments, the security engine 138 is also capable of communicating using the communication circuitry 136 or a dedicated communication circuit independently of the state of the computing device 100 (e.g., independently of the state of the main processor 120), also known as "out-of-band" communication.

The cryptographic engine 140 may be embodied as any microcontroller, microprocessor, functional block, logic, or other circuit or collection of circuits capable of performing the functions described herein. As further described below, the cryptographic engine 140 may encrypt and/or decrypt I/O data read or written by the I/O controllers 144 in one or more direct memory access (DMA) operations to the memory 132. The cryptographic engine 140 includes an internal channel identifier (CID) table 142, which the cryptographic engine 140 uses to dynamically identify DMA channel(s) to be protected. The CID table 142 may be controlled and/or programmed by trusted software, for example using the crypto engine programming support 126 of the processor 120. The encryption keys and/or other secret information of the CID table 142 are not available to untrusted software. In some embodiments, the cryptographic engine 140 may be incorporated along with the I/O subsystem 128 and/or the processor 120 in a system-on-a-chip (SoC) of the computing device 100.

Similarly, the I/O controllers 144 may be embodied as any embedded controller, microcontroller, microprocessor, functional block, logic, or other circuit or collection of circuits capable of performing the functions described herein. In some embodiments, one or more of the I/O controllers 144 may be embedded in another component of the computing device 100 such as the I/O subsystem 128 and/or the processor 120. Additionally or alternatively, one or more of the I/O controllers 144 may be connected to the I/O subsystem 128 and/or the processor 120 via an expansion bus such as PCI Express (PCIe) or other I/O connection. As further described below, the I/O controllers 144 communicate with one or more I/O devices 146, for example over a peripheral communications bus (e.g., USB, Bluetooth, etc.). The I/O devices 146 may be embodied as any I/O device, such as human interface devices, keyboards, mice, touch screens, microphones, cameras, and other input devices, as well as displays and other output devices. As described above, the I/O controllers 144 and associated DMA channels are uniquely identified using identifiers called channel identifiers (CIDs). Each I/O controller 144 may assert an appropriate CID with every DMA transaction, for example as part of a transaction layer packet (TLP) prefix, to uniquely identify the source of the DMA transaction and provide liveness protections. The CID also enables the isolation of I/O from different devices 146.

In use, the cryptographic engine 140 snoops all DMA transactions generated by the I/O controllers 144 to the memory 132. On each transaction to or from a device 146 capable of participating in trusted I/O, the cryptographic engine 140 references the CID table 142 to find the CID corresponding to the DMA channel in the CID table 142. A match indicates that the channel is currently protected and that the cryptographic engine 140 should use the channel key associated with the channel to protect the data written to and/or the data read from memory 132 (depending on the direction of the channel).

Figure 2:
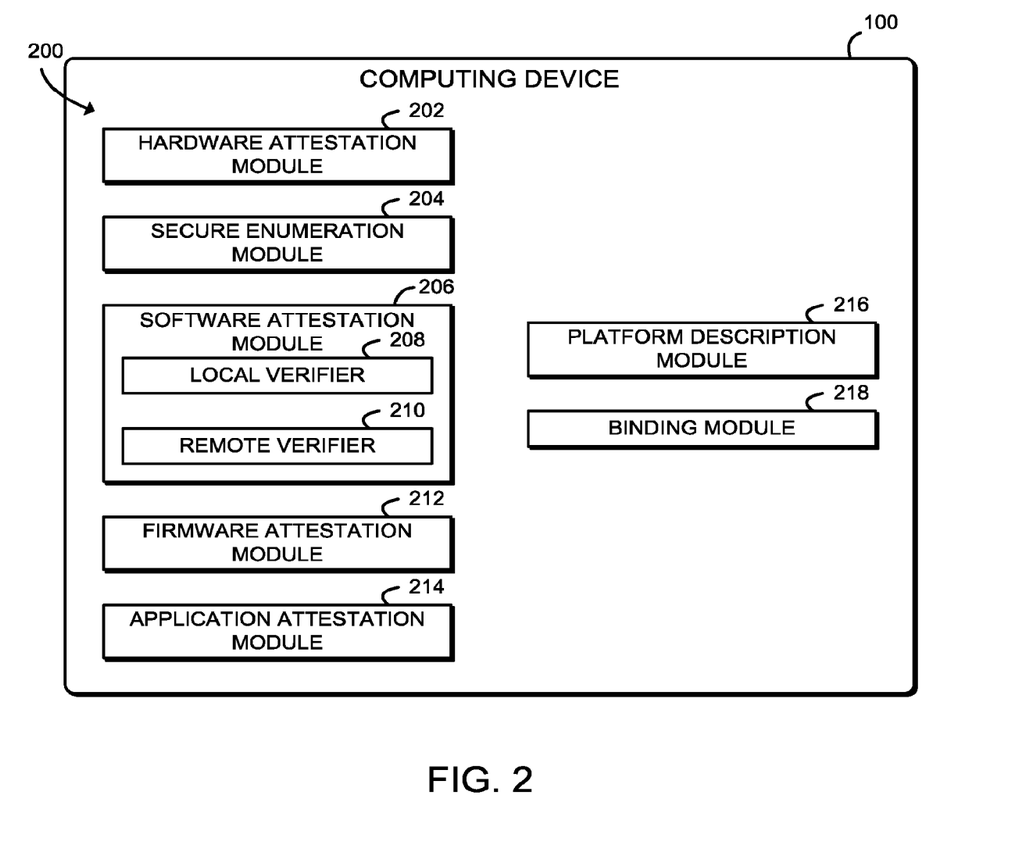
FIG. 2 is a simplified block diagram of at least one embodiment of various environments that may be established by the computing device of FIG. 1.

Referring now to FIG. 2, in an illustrative embodiment, the computing device 100 establishes an environment 200 during operation. The illustrative environment 200 includes a hardware attestation module 202, a secure enumeration module 204, a software attestation module 206, a firmware attestation module 212, and an application attestation module 214. In some embodiments, the environment 200 may also include a platform description module 216 and a binding module 218. The various modules of the environment 200 may be embodied as hardware, firmware, software, or a combination thereof. As such, in some embodiments, one or more of the modules of the environment 200 may be embodied as circuitry or collection of electrical devices (e.g., hardware attestation circuitry 202, secure enumeration circuitry 204, software attestation circuitry 206, firmware attestation circuitry 212, application attestation circuitry 214, platform description circuitry 216 and/or binding circuitry 218). It should be appreciated that, in such embodiments, one or more of the hardware attestation circuitry 202, the secure enumeration circuitry 204, the software attestation circuitry 206, the firmware attestation circuitry 212, the application attestation circuitry 214, the platform description circuitry 216 and/or the binding circuitry 218 may form a portion of one or more of the processor 120, the I/O subsystem 128, and/or other components of the computing device 100. Additionally, in some embodiments, one or more of the illustrative modules may form a portion of another module and/or one or more of the illustrative modules may be independent of one another.

The hardware attestation module 202 is configured to collect hardware attestation information associated with one or more statically attached hardware I/O components of the computing device 100. The hardware I/O components are associated with a trusted I/O usage protected with the cryptographic engine 140, and may include components such as one or more statically connected I/O controllers 144 and/or I/O devices 146. The hardware attestation module 202 is further configured to verify the hardware attestation information.

The secure enumeration module 204 is configured to securely enumerate one or more dynamically attached hardware I/O components of the computing device 100 in response to verification of the hardware attestation information and to load one or more trusted software components in response to secure enumeration of the hardware I/O components. For example, as described further below, the secure enumeration module 204 may be configured to enumerate I/O controllers 144 and/or I/O devices 146 and to load one or more secure enclaves, secured with the secure enclave support 124 of the processor 120, in response to enumerating the hardware components. The secure enumeration module 204 may be further configured to initialize one or more protected DMA channels associated with the trusted I/O usage, which are protected by the cryptographic engine 140.

The software attestation module 206 is configured to collect software attestation information associated with the trusted software components loaded by the secure enumeration module 204. The software attestation information is indicative of the identity and the topology of the trusted software components. For example, the software attestation information may include one or more secure enclave reports, which are each indicative of a cryptographic measurement of a trusted software component. The software attestation module 206 is further configured to verify the software attestation information. The software attestation module 206 may be configured to verify the software attestation information locally, or to submit the software attestation information to a remote verification service. In some embodiments, those functions may be performed by one or more sub-modules, such as a local verifier 208 and/or a remote verifier 210.

The firmware attestation module 212 is configured to collect firmware attestation information associated with one or more of the I/O controllers 144 of the computing device 100. The firmware attestation module 212 is further configured to verify the firmware attestation information. The firmware attestation information may be collected and verified by a trusted system agent of the computing device 100, such as the security engine 138.

The application attestation module 214 is configured to collect application attestation information associated with a trusted application of the computing device 100. The trusted application uses the trusted I/O usage, for example by consuming trusted keyboard input. The application attestation module 214 is further configured to verify the application attestation information. The application attestation information may include a secure enclave quote of the trusted application, which may be embodied as a signed secure enclave report.

The platform description module 216 is configured to read a platform description indicative of hardware components of a target computing device and generate a platform manifest based on the platform description. The platform manifest is indicative of one or more hardware components of the target computing device that are capable of trusted I/O, such as one or more I/O controllers 144 and/or I/O devices 146. The binding module 218 is configured to bind the platform manifest to the target computing device. In some embodiments, the computing device 100 may be the target computing device.

Figure 3:
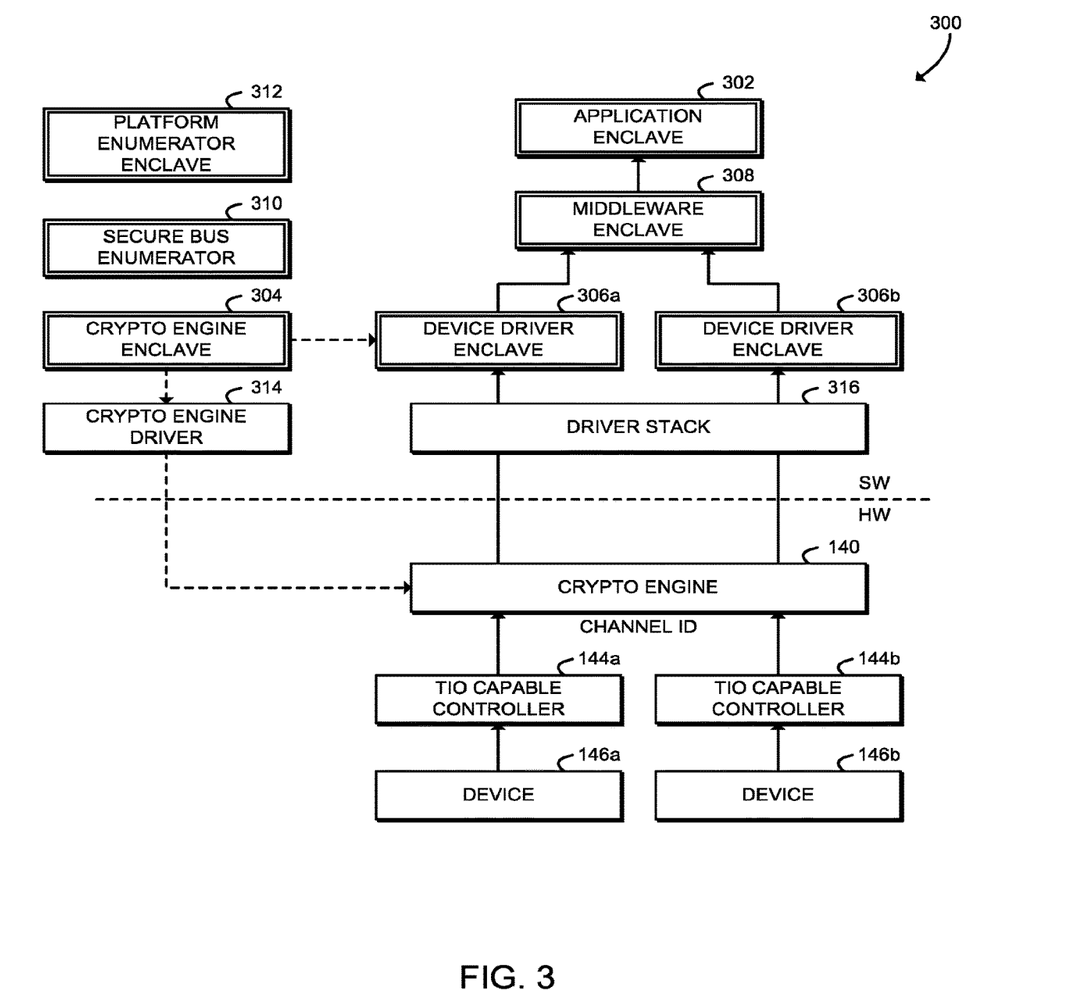
FIG. 3 is a simplified block diagram of at least one embodiment of a system architecture that may be established by the computing device of FIGS. 1-2.

Referring now to FIG. 3, diagram 300 illustrates a system architecture that may be established by the computing device 100. The system architecture 300 includes several trusted I/O (TIO) software components, including a trusted application enclave 302, a crypto engine enclave (CEE) 304, one or more device driver enclaves (DDEs) 306, one or more middleware enclaves 308, one or more secure bus enumerators (SBEs) 310, and a platform enumerator enclave (PEE) 312. The system architecture 300 also includes untrusted software components, including a crypto engine driver 314 and an untrusted I/O driver stack 316. The TIO software components are illustratively embodied as secure enclaves protected by the secure enclave support 124 of the processor 120. It should be understood that in other embodiments, the TIO software components may be hosted by any other appropriate trusted execution environment. For example, in some embodiments, the TIO software components may be embodied as components inside a trusted virtual machine.

The application enclave 302 may be embodied as trusted software that may securely use one or more of the I/O device(s) 146. For example, in the illustrative embodiment the application enclave 302 consumes input data from two I/O devices 146a, 146b, which are connected via I/O controllers 144a, 144b. The application enclave 302 may be hosted by an unprotected application process. Protected I/O data that is input from or output to a device 146 passes through the unprotected I/O driver stack 316, which may include one or more unprotected I/O drivers such as bus drivers, device drivers, and/or filter drivers. The untrusted I/O driver stack 316 may pass protected data to the application enclave 302 via one or more appropriate DDEs 306 and/or middleware enclaves 308.

The CEE 304 may be embodied as a secure enclave that communicates with the crypto engine driver 314 to program encryption keys and DMA channel information into the cryptographic engine 140 on behalf of an application enclave 302 and/or DDE 306 (for example, using the EBINDTIO processor instruction of the crypto engine programming support 126). The crypto engine driver 314 may be embodied as an unprotected kernel-mode driver that programs the cryptographic engine 140 (for example, using the UNWRAP processor instruction of the crypto engine programming support 126). Each SBE 310 may be embodied as a bus-specific enclave that enumerates hot-pluggable devices 146 for a particular bus, such as a USB bus. The PEE 312 may be embodied as a specialized SBE 310 that "enumerates" static devices attached to the computing device 100. Each DDE 306 may be embodied as a secure enclave that manages a specific (or a specific class of) I/O device 146. For example, an HID DDE 306 may manage human interface device (HID) devices 146. Each DDE 306 may receive protected input and perform processing before sending the input to the application enclave 302 over a secure channel. As shown, the system architecture 300 may also include one or more middleware enclaves 308, which may perform additional processing of secure I/O data before it is provided to the application enclave 302.

Figure 4:
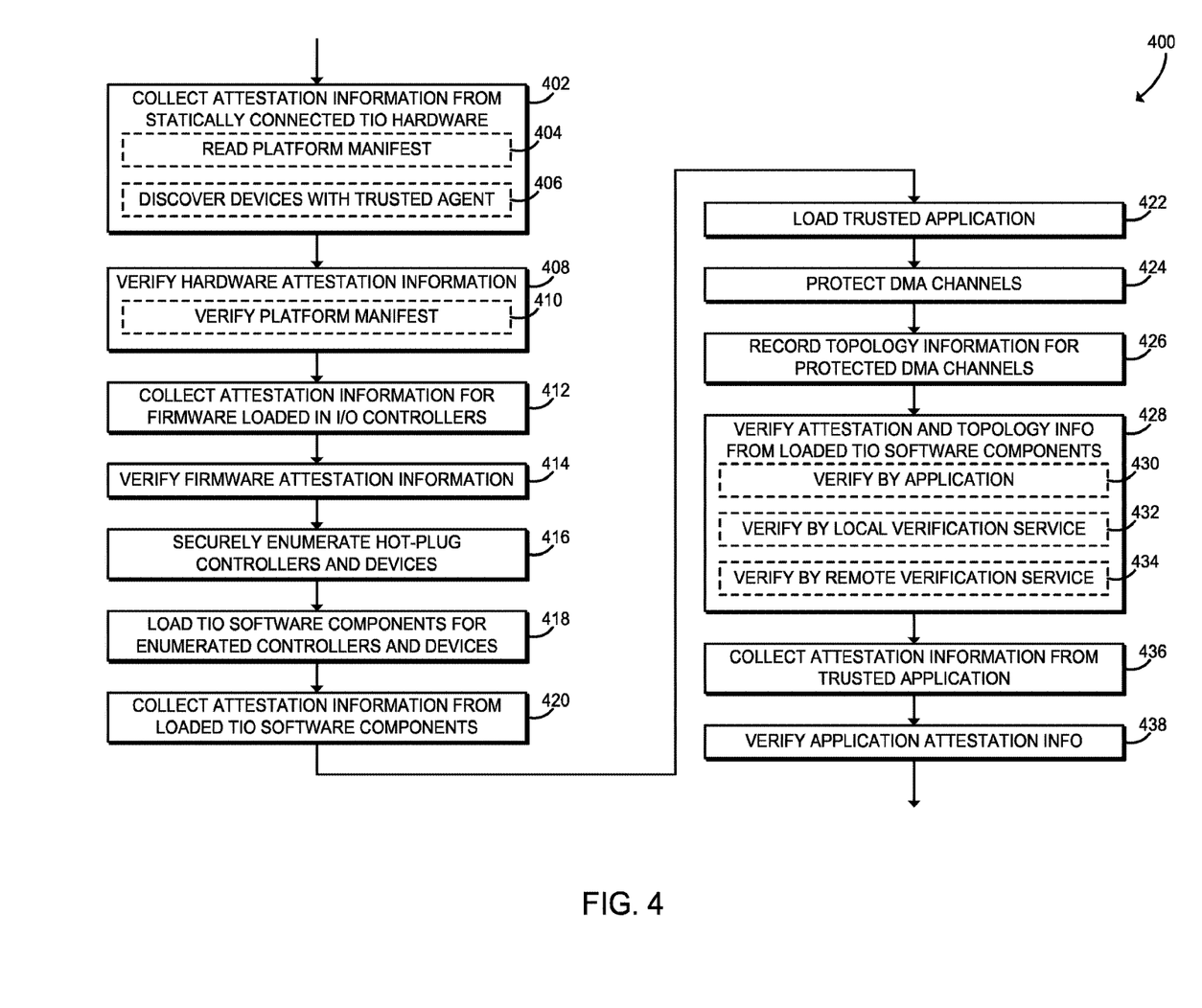
FIG. 4 is a simplified flow diagram of at least one embodiment of a method for secure hardware and software attestation that may be executed by the computing device of FIGS. 1-3.

Referring now to FIG. 4, in use, the computing device 100 may execute a method 400 for secure hardware and software attestation. The method 400 begins with block 402, in which the computing device 100 collects attestation information from statically connected hardware components capable of trusted I/O. For example, the computing device 100 may collect attestation information for statically connected I/O controllers 144 (e.g., USB controllers and other expansion bus controllers) as well as statically connected I/O devices 146 (e.g., integrated keyboards, touchscreens, or other integrated I/O devices). In some embodiments, in block 404 the computing device 100 may read a platform manifest to collect the attestation information. The platform manifest may be embodied as any data file, data table, firmware data, or other data indicative of the TIO capable hardware components of the computing device 100. For example, the platform manifest may include information describing the I/O controllers 144, such as a bus descriptor (e.g., USB, Bluetooth, etc.), a controller ID, a number of DMA channels supported, and/or whether I/O the controller 144 is hot-plug-capable. As another example, the platform manifest may include information describing the I/O devices 146, such as a class descriptor (e.g., fingerprint reader, touchscreen, etc.) and a channel ID. The platform manifest may be created, installed, or otherwise provisioned to the computing device 100 during manufacture. One potential embodiment of a method for creating a platform manifest is described below in connection with FIG. 7.

In some embodiments, in block 406, the computing device 100 may discover the statically connected I/O controllers 144 and/or devices 146 using a trusted system agent such as the security engine 138. The system agent may be connected to the TIO-capable hardware (e.g., the I/O controllers 144 and/or the devices 146) through sideband interfaces that are not accessible to host software. In some embodiments, the system agent may query the I/O controllers 144 and construct a platform manifest that includes device information as described above. Additionally or alternatively, the system agent may construct the platform manifest using hierarchical enumeration methods, for example by recursively discovering all PCIe controllers 144 and then discovering the devices 146 attached to each controller 144. This information may be securely provided to a trusted software entity, such as the Platform Enumeration Enclave (PEE) 312, which may then use that information to initiate secure enumeration as described below. Additionally, the attestation information may include the identity of the firmware running on the system agent (e.g., the firmware of the security engine 138) so that the verifier can determine if the verifier trusts the reporting of the hardware configuration of the computing device 100 by the system agent. Although illustrated as using the security engine 138, it should be understood that the system agent may be embodied as any trusted agent of the computing device 100 capable of communicating information about hardware components in a secure manner to a trusted TIO software entity.

In block 408, the computing device 100 verifies the attestation information associated with the statically connected hardware components. Verifying the attestation information ensures that the hardware attestation information is authentic and that it describes the local computing device 100. The verification may be performed by the trusted system agent (e.g., the security engine 138) and/or one or more trusted software entities. In some embodiments, in block 410 the computing device 100 may verify the platform manifest. One potential embodiment of a method for verifying the platform manifest is described below in connection with FIG. 6.

In block 412, the computing device 100 collects attestation information for firmware loaded in the I/O controllers 144. The computing device 100 may collect attestation information such as the identity of the I/O controller 144, the identity of the firmware code (e.g., a cryptographic hash of the firmware code), the signer of the firmware code, and/or a security version number of the firmware code. The attestation information may be collected by a trusted system agent such as the security engine 138 that loads the firmware code into the I/O controllers 144 (e.g., the security engine 138 BUP and RBE firmware on Intel® platforms). In block 414, the computing device 100 verifies the attestation information for the firmware. The computing device 100 may verify, for example, the cryptographic hash of the firmware code and ensure that the code was signed by a trusted entity (e.g., a processor manufacturer such as Intel® or a manufacturer of the computing device 100), verify the security version number, or verify other information associated with the firmware code.

In block 416, after verifying the hardware attestation information, the computing device 100 securely enumerates hot-plug capable I/O controllers 144 and/or I/O devices 146. The computing device 100 discovers I/O controllers 144 or I/O devices 146 that are dynamically attached to the computing device 100, such as external USB keyboards, wireless keyboards, or other peripheral devices. In some embodiments, the computing device 100 may enumerate I/O controllers 144 and/or I/O devices 146 used by a requested TIO usage (e.g., a text input usage).

In block 418, the computing device 100 loads trusted TIO software components for the enumerated I/O controllers 144 and I/O devices 146. As the I/O controllers 144 and I/O devices 146 are securely enumerated, the computing device 100 may load the associated TIO software components. For example, the computing device 100 may load a secure bus enumerator (SBE) 310 for each hot-plug capable I/O controller 144 determined to be statically connected to the computing device 100 and a device driver enclave (DDE)

306 for each I/O device 146 attached to the I/O controllers 144 (including hot-plugged devices). Of course, the computing device 100 may also load TIO software components such as the CEE 304 and/or the PEE 312 for statically attached hardware components.

In block 420, the computing device 100 collects attestation information from the trusted software components as they are loaded. The attestation information may be collected by a trusted software component such as the crypto engine enclave (CEE) 304 from other loaded TIO enclaves such as the PEE 312, the SBEs 310, the DDEs 306, the middleware enclaves 308, and the CEE 304 itself. Those TIO software components attest to their identity and report their identity to the CEE 304. In the illustrative embodiment, the TIO components report their identity using the secure enclave report and/or quote mechanisms, for example by generating a secure enclave report targeted to the CEE 304. The software attestation information may include information such as software component type (e.g., CEE 304, DDE 306, SBE 310, PEE 312, etc.); software component identity, such as a measurement of the secure enclave (MR_EN-CLAVE); identity of the signer of the secure enclave (MR_SIGNER); a security version number; and/or an associated device (e.g., the associated I/O controller 144 for SBEs 310 or the class of the I/O device 146 for DDEs 306). Although illustrated as using the secure enclave reporting mechanism provided by the secure enclave support 124 of the processor 120, it should be understood that the particular attestation mechanism used for TIO software components depends on the trusted execution environment (TEE) that hosts the components. For example, components inside a trusted virtual machine may use the measurement of the hosting VMM that was recorded at boot time.

In block 422, the computing device 100 loads a trusted application 302. The trusted application 302 consumes or otherwise uses a trusted usage of the I/O devices 146. For example, a trusted application 302 may use trusted keyboard input, for example to receive user passwords or other sensitive information. As shown in FIG. 3, the trusted application 302 may be embodied as an application enclave 302 that is protected with the secure enclave support 124 of the processor 120. In block 424, the trusted application 302 initializes protected DMA channels for use with the I/O devices 146 associated with the trusted usage. The trusted application 302 may use the crypto engine programming support 126 of the processor 120 to program the cryptographic engine 140 to protect DMA channels associated with one or more I/O devices 146. It should be understood that one or more other trusted components of the computing device 100 may program the DMA channels to secure, such as the CEE 304 or one or more DDEs 306.

In block 426, the computing device 100 records topology information for the protected DMA channels. The topology information provides details about the connections between the various TIO software components (e.g., the trusted application 302, the DDEs 306, middleware enclaves 308, etc.) and the hardware (e.g., the cryptographic engine 140, the I/O controllers 144, and/or the I/O devices 146). As described below, this information is used to verify that a secure software stack has been correctly set up for trusted I/O.

In block 428, the computing device 100 verifies the attestation information and the topology information associated with the trusted I/O software components. The CEE 304 may report the software attestation information collected from the TIO software components (e.g., the DDEs 306, the middleware enclaves 308, the SBEs 310, and/or the PEE 312), as well as its own attestation information, to the trusted application 302. The computing device 100 verifies that all I/O devices 146 needed for a particular usage are properly connected to the trusted application 302 via trusted CEE 304, DDEs 306, middleware enclaves 308, and/or SBE 310 enclaves. For example, a policy from an operating system vendor, an independent software vendor, or other source may be available to the verifying entity to derive the list of I/O devices 146 for a specific TIO usage, such as trusted text input. Such a policy may specify that all touch and HID keyboards 146 of the computing device 100 must be secured before trusted text input can be consumed. Using the topology of the connected enclaves and this policy, the verifier searches for all I/O devices 146 starting from the trusted application 302 and verifies that the needed I/O devices 146 for the TIO usage is a subset of the reachable devices 146. The verifier also ensures that all nodes (i.e., TIO software components) on the paths are trustworthy by verifying their attestation information. The mechanism for verification of attestation information is flexible and allows different trusted entities to perform verification, per security requirements connected with specific usages.

In some embodiments, in block 430 the trusted application 302 may verify the attestation information and/or the topology information. For example, the application enclave 302 may perform the verification itself based on a policy provisioned by an independent software vendor. In some embodiments, in block 432, a local verification service of the computing device 100 may verify the attestation information and/or the topology information. The application enclave 302 may delegate the verification to a local platform entity which may be owned by the platform manufacturer, OS vendor, or other third party. For example, a computing device 100 may ship with a service installed by the manufacturer that uses a default verification policy provisioned on the computing device 100. As software and firmware components are updated on the computing device 100, the local service may receive information about the updates (e.g., new enclave measurements, version information, etc.) from a trusted online service and use this information to verify the attestation information provided by the updated software components. In some embodiments, in block 432, the computing device 100 may submit the attestation information and the topology information to a remote verification service for verification. The application enclave 302 may delegate the verification to a remote verification service and provide attestation information to the remote service for verification. The remote verification service may be provided by the platform manufacturer, processor manufacturer (e.g., Intel® Corporation), or other third party. Remote verification may be required for certain high assurance usages.

Figure 5:
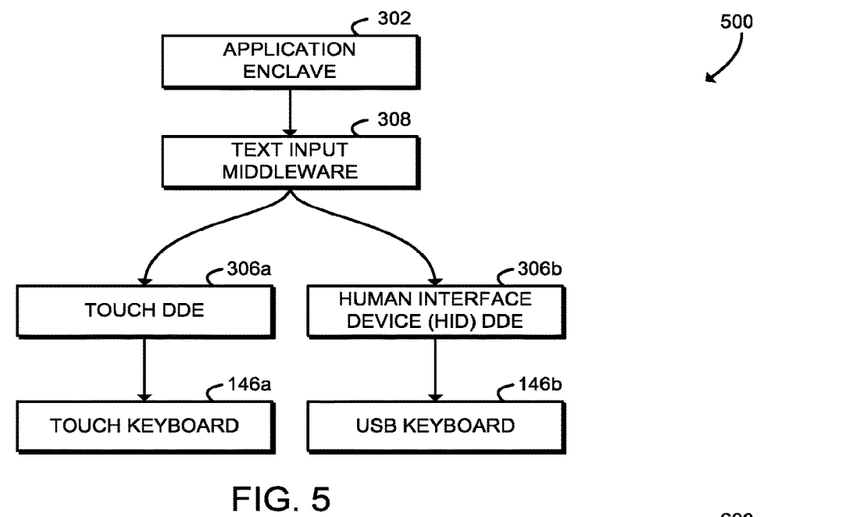
FIG. 5 is a schematic diagram illustrating a software topology that may be established by the computing device of FIGS. 1-3.

Referring now to FIG. 5, schematic diagram 500 illustrates one potential embodiment of software attestation and topology information that may be captured by the CEE 304 and verified by the trusted application 302 or other verifier. The diagram 500 illustrates connections between various TIO software components for a trusted keyboard input usage. In the illustrative example, the trusted application 302 is connected to a text input middleware enclave 308 that gathers input from various types of keyboards (USB, touch screen, etc.). The text input middleware enclave 308 is in turn connected to the touch keyboard DDE 306*a* and the human interface device (HID) DDE 306*b*. The DDEs 306*a*, 306*b* are cryptographically connected via the cryptographic engine 140 to a touch keyboard 146*a* and a USB keyboard 146*b*, respectively. Since there are secure paths (through the TIO software components) starting at the application enclave 302 and reaching every type of keyboard device 146 specified by the policy, the verifier may determine that it is safe to perform the requested TIO usage.

Referring back to FIG. 4, in block 436 the computing device 100 collects attestation information from the application enclave 302. The application enclave 302 may attest to information including the identity of the application, such as a measurement of the enclave (MR_ENCLAVE); the identity of the signer of the enclave (MR_SIGNER); and a security version number. The application enclave 302 may generate a quote to attest to its verifier, which may be embodied as a secure enclave report signed with the EPID key of the computing device 100 by a quoting enclave. In block 438, the computing device 100 verifies the attestation information from the application enclave 302. The computing device 100 may verify the application attestation information by submitting the application attestation information to a remote verification service, for example a verification service provided by an independent software vendor (ISV). After verifying the attestation information, the method 400 is completed and the trusted application 302 may securely access the I/O devices 146 associated with the requested secure usage. The method 400 may be repeatedly executed, for example after each platform reset or at other appropriate times.

Figure 6:
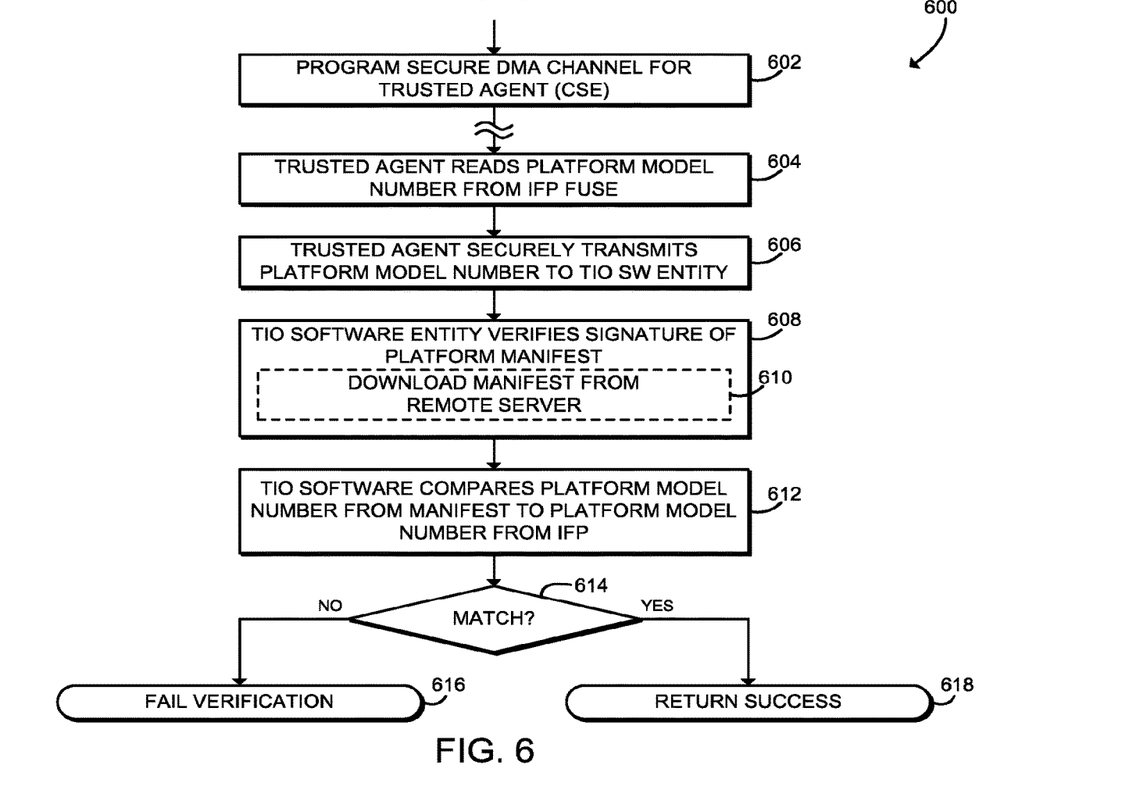
FIG. 6 is a simplified flow diagram of at least one embodiment of a method for hardware attestation information verification that may be executed by the computing device of FIGS. 1-3.

Referring now to FIG. 6, in use, the computing device 100 may execute a method 600 for verifying the hardware attestation information. The method 600 begins with block 602, in which the computing device 100 programs a secure DMA channel associated with the trusted system agent, which is illustratively the security engine 138. The security engine 138 may be statically assigned a channel ID (CID) that is programmed into the cryptographic engine 140 by trusted software. As described below, the security engine 138 may use the secure DMA channel to deliver information securely to a TIO software entity.

In block 604, the trusted system agent reads a platform model number from an in-field programmable (IFP) fuse of the computing device 100. The IFP fuse may be embodied as any secure hardware fuse or other component that may be set once during manufacture of the computing device 100 but may not be tampered with or otherwise altered after manufacture. The security engine 138 may include "fuse puller" hardware to read the value of the platform model number from the IFP fuse. One embodiment of a method for configuring the IFP fuse is described further below in connection with FIG. 7.

In block 606, the trusted system agent securely transmits the platform model number to a TIO software component. The security engine 138 may transmit the platform model number securely to a trusted TIO software component such as the PEE 312 and/or the CEE 304. As described above, the security engine 138 may transmit the data over a protected DMA channel to the TIO software component, and the cryptographic engine 140 will encrypt the data with the key assigned to the DMA channel, which is also known to the TIO software component. Therefore, only the TIO software component may decrypt the value in the IFP fuse returned by the security engine 138.

In block 608, the TIO software component verifies the signature of the platform manifest. For example, the PEE 312 may verify the signature on the platform manifest to be that of the manufacturer. In some embodiments, to verify the signature locally on the computing device 100, the manufacturer certificate and a certificate chain may be provisioned to the computing device 100, and the verification entity may walk through the certificate chain until it reaches a trusted root Certificate Authority (CA) to determine if the manufacturer certificate is valid. The platform manifest may not be stored on the computing device 100 by the manufacturer. In some embodiments, in block 610, the computing device 100 may download the platform manifest from a remote server. For example, the computing device 100 may request the platform manifest associated with the platform model number. Additionally or alternatively, in some embodiments, to verify the platform manifest remotely, the manufacturer certificate may be included in the hardware attestation information, which the remote service can verify to determine if it is valid.

In block 612, the TIO software component compares a platform model number included in the platform manifest to the platform model number pulled from the IFP fuse. If the two platform model numbers match, the PEE 312 can be certain that the platform manifest is authentic and that the platform manifest describes the local computing device 100. In block 614, the TIO software component determines whether the platform model numbers match. If not, the method 600 branches to block 616, in which the TIO software component indicates that verification has failed and the method 600 is completed. Referring back to block 614, if the platform model numbers match, the method 600 branches to block 618, in which the TIO software component returns success, indicating that the hardware attestation information was successfully verified. After successful hardware verification, the computing device 100 may continue with secure enumeration of I/O controllers 144 and I/O devices 146 as described above in connection with FIG. 4.

Figure 7:
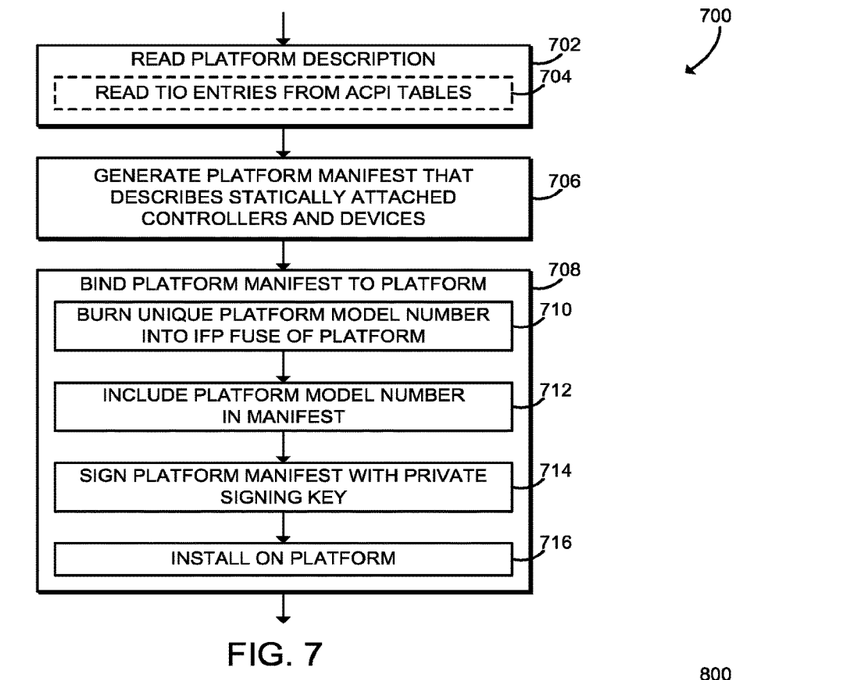
FIG. 7 is a simplified flow diagram of at least one embodiment of a method for platform manifest generation that may be executed by the computing device of FIGS. 1-3.

Referring now to FIG. 7, in use, the computing device 100 may execute a method 700 for platform manifest generation. The method 700 may be executed during manufacture of the computing device 100, for example within a manufacturer's secure facility. Although illustrated as being executed by the computing device 100, it should be understood that in some embodiments the method 700 may be executed by a different computing device used during the manufacturing process. The method 700 begins with block 702, in which the computing device 100 reads a platform description of the computing device 100. The platform manufacturer, which is within the TIO trusted code base (TCB), already has information about the I/O controllers 144 and I/O devices 146 included in the computing devices 100 that the manufacturer assembles. The computing device 100 may use any technique to read or otherwise determine the description of the computing device 100. In some embodiments, in block 704, the computing device 100 may read the platform description from one or more TIO-specific entries of an ACPI table of the computing device 100. For many computing devices 100, a description of the hardware components of the computing device 100, along with several attributes that may be useful for device configuration and power management, is already available in ACPI firmware tables, which are generated by the platform manufacturer. In order to facilitate hardware attestation, the manufacturer of the computing device 100 may add TIO-specific attributes as objects into the ACPI tables of the computing device 100.

Figure 8:
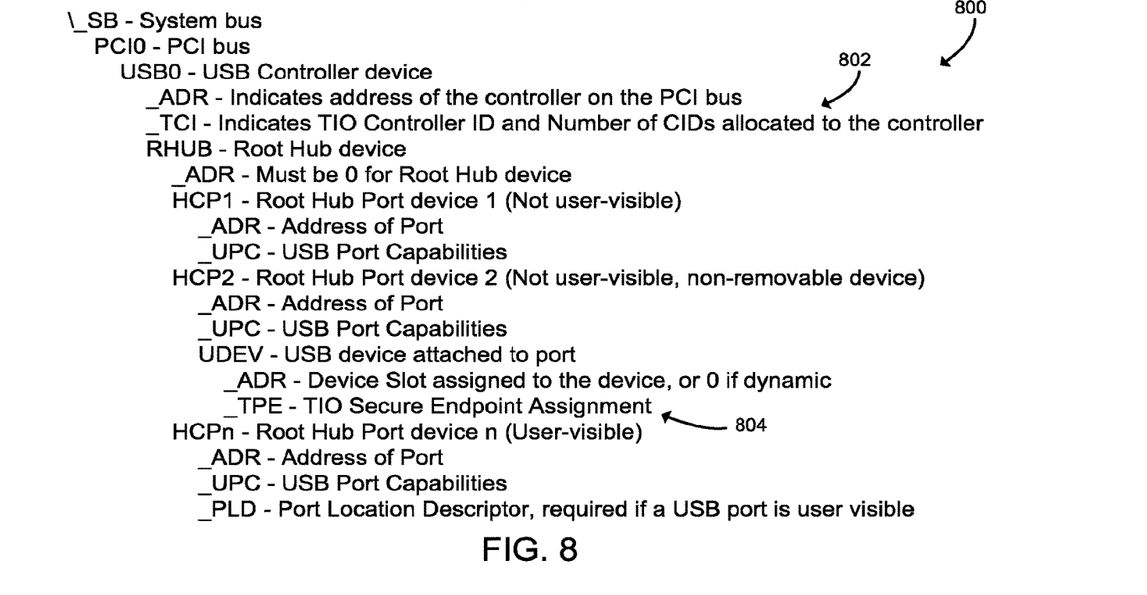
FIG. 8 is a pseudocode diagram illustrating platform description tables that may be processed by the computing device of FIGS. 1-3.

Referring now to FIG. 8, pseudocode 800 illustrates one potential embodiment of ACPI tables that may be included in a computing device 100 having a TIO-capable USB controller 144. As shown in FIG. 8, two objects _TCI 802 and _TPE 804 are included in the USB controller description. Illustratively, the _TCI 802 object describes the unique ID of the USB controller 144 and the number of TIO channels dedicated to it. The optional _TPE 804 object describes specific endpoints of a device 146 connected to the controller 144 that should be secured at power-up.

Referring back to FIG. 7, in block 706, the computing device 100 generates a platform manifest that describes the statically attached I/O controllers 144 and I/O devices 146 of the computing device 100. For example, the computing device 100 may generate a platform hardware manifest from the ACPI tables that describe the TIO-capable hardware of the computing device 100, such as statically attached I/O controllers 144 and I/O devices 146, as well as hot-plug-capable I/O controllers 144 that can support TIO. The platform manifest may be generated by a tool that reads the ACPI tables, parses the TIO-specific information out of the ACPI tables, and includes the TIO-specific information in a platform manifest file.

In block 708, the computing device 100 binds the platform manifest to the computing device 100. The platform manifest is bound to the computing device 100 so that a manifest describing another platform (e.g., a different computing device 100) cannot be substituted for it and cause the secure enumeration process to not reveal all the I/O devices 146 on the computing device 100 correctly. In block 710, the computing device 100 burns a unique platform model number into an in-field programmable (IFP) fuse of the computing device 100. Each unique model of computing device 100 (in the sense of the combination of TIO-capable hardware on the computing device 100) may be associated with a unique platform model number. This model number may be programmed into the IFP fuse. As described above, fuse-puller hardware of the security engine 138 of the computing device 100 may read the platform model number, which may be used to verify the platform manifest. In block 712, the computing device 100 includes the platform model number in the platform manifest of the computing device 100. In block 714, the computing device 100 signs the platform manifest with a private signing key of the manufacturer. In block 716, the computing device 100 installs the signed platform manifest on the computing device 100. After installing the platform manifest, the method 700 is completed.

It should be appreciated that, in some embodiments, the methods 400, 600, 700 may be embodied as various instructions stored on a computer-readable media, which may be executed by the processor 120, the cryptographic engine 140, and/or other components of the computing device 100 to cause the computing device 100 to perform the corresponding method 400, 600, 700. The computer-readable media may be embodied as any type of media capable of being read by the computing device 100 including, but not limited to, the memory 132, the data storage device 134, microcode of the processor 120, memory of the cryptographic engine 140, firmware of the cryptographic engine 140, and/or other media.

EXAMPLES

Illustrative examples of the technologies disclosed herein are provided below. An embodiment of the technologies may include any one or more, and any combination of, the examples described below.

Example 1 includes a computing device for trusted I/O attestation and verification, the computing device comprising: a hardware attestation module to (i) collect hardware attestation information associated with one or more statically attached hardware I/O components of the computing device, wherein the hardware I/O components are associated with a trusted I/O usage protected with a cryptographic engine of the computing device, and (ii) verify the hardware attestation information; a secure enumeration module to (i) securely enumerate one or more dynamically attached hardware I/O components of the computing device in response to verification of the hardware attestation information, and (ii) load one or more trusted software components in response to secure enumeration of the one or more dynamically attached hardware I/O components; and a software attestation module to (i) collect software attestation information associated with the trusted software components in response to loading of the trusted software components, wherein the software attestation information is indicative of identity and topology of the trusted software components, and (ii) verify the software attestation information.

Example 2 includes the subject matter of Example 1, and wherein to collect the hardware attestation information comprises to read a platform manifest of the computing device, wherein the platform manifest is indicative of the statically attached hardware I/O components.

Example 3 includes the subject matter of any of Examples 1 and 2, and wherein to verify the hardware attestation information comprises to verify, by a trusted software component of the computing device, a cryptographic signature of the platform manifest.

Example 4 includes the subject matter of any of Examples 1-3, and wherein to verify the hardware attestation information further comprises to: read, by a trusted system agent of the computing device, a platform model identifier from an in-field programmable fuse of the computing device; securely transmit, by the trusted system agent, the platform model identifier to the trusted software component; and compare, by the trusted software component, the platform model identifier to a second platform model identifier of the platform manifest in response to verification of the cryptographic signature of the platform manifest.

Example 5 includes the subject matter of any of Examples 1-4, and wherein the trusted system agent comprises a converged security engine of the computing device.

Example 6 includes the subject matter of any of Examples 1-5, and wherein collecting the hardware attestation information associated with the one or more statically attached hardware I/O components comprises discovering, by a trusted system agent of the computing device, the statically attached hardware I/O components.

Example 7 includes the subject matter of any of Examples 1-6, and wherein the trusted system agent comprises a converged security engine of the computing device.

Example 8 includes the subject matter of any of Examples 1-7, and wherein to collect the software attestation information comprises to generate one or more secure enclave reports, wherein each secure enclave report is indicative of a cryptographic measurement of a trusted software component.

Example 9 includes the subject matter of any of Examples 1-8, and wherein to verify the software attestation information comprises to: determine one or more hardware I/O devices required by the trusted I/O usage; determine, based on the software attestation information, that each of the one or more hardware I/O devices required by the trusted I/O usage is reachable via a secure I/O path from a trusted application associated with the trusted I/O usage; and verify an identity of each trusted software component associated with each secure I/O path.

Example 10 includes the subject matter of any of Examples 1-9, and wherein to verify the software attestation information comprises to verify the software attestation information by a trusted application of the computing device.

Example 11 includes the subject matter of any of Examples 1-10, and wherein to verify the software attestation information comprises to submit the software attestation information to a local verification service of the computing device.

Example 12 includes the subject matter of any of Examples 1-11, and wherein to verify the software attestation information comprises to submit the software attestation information to a remote verification service.

Example 13 includes the subject matter of any of Examples 1-12, and further comprising a firmware attestation module to (i) collect firmware attestation information associated with one or more I/O controllers of the computing device, and (ii) verify the firmware attestation information.

Example 14 includes the subject matter of any of Examples 1-13, and wherein: to collect the firmware attestation information comprises to collect the firmware attestation information by a trusted system agent of the computing device; and to verify the firmware attestation information comprises to verify the firmware attestation information by the trusted system agent.

Example 15 includes the subject matter of any of Examples 1-14, and wherein the firmware attestation information comprises a cryptographic hash of firmware code associated with the one or more I/O controllers.

Example 16 includes the subject matter of any of Examples 1-15, and wherein the trusted system agent comprises a converged security engine of the computing device.

Example 17 includes the subject matter of any of Examples 1-16, and further comprising an application attestation module to (i) collect application attestation information associated with a trusted application of the computing device, wherein the trusted application uses the trusted I/O usage, and (ii) verify the application attestation information.

Example 18 includes the subject matter of any of Examples 1-17, and wherein to verify the application attestation information comprises to submit the application attestation information to a remote verification service.

Example 19 includes the subject matter of any of Examples 1-18, and wherein the application attestation information comprises a secure enclave quote of the trusted application, wherein the secure enclave quote comprises a signed secure enclave report, and wherein the secure enclave report is indicative of a cryptographic measurement of the trusted application.

Example 20 includes the subject matter of any of Examples 1-19, and wherein the secure enumeration module is further to initialize one or more protected DMA channels associated with the trusted I/O usage.

Example 21 includes a computing device for generating a platform manifest, the computing device comprising: a platform description module to (i) read a platform description indicative of hardware components of a target computing device, and (ii) generate a platform manifest based on the platform description, wherein the platform manifest is indicative of one or more hardware components of the target computing device that are capable of trusted I/O; and a binding module to bind the platform manifest to the target computing device.

Example 22 includes the subject matter of Example 21, and wherein to read the platform description comprises to read a platform firmware description table.

Example 23 includes the subject matter of any of Examples 21 and 22, and wherein to generate the platform manifest comprises to generate a platform manifest indicative of one or more statically attached I/O controllers of the target computing device that are capable of trusted I/O.

Example 24 includes the subject matter of any of Examples 21-23, and wherein to bind the platform manifest to the target computing device comprises to: burn a platform model identifier into an in-field programmable fuse of the target computing device; include the platform model identifier in the platform manifest; and cryptographically sign the platform manifest in response to inclusion of the platform model identifier in the platform manifest.

Example 25 includes the subject matter of any of Examples 21-24, and wherein the computing device comprises the target computing device.

Example 26 includes a method for trusted I/O attestation and verification, the method comprising: collecting, by a computing device, hardware attestation information associated with one or more statically attached hardware I/O components of the computing device, wherein the hardware I/O components are associated with a trusted I/O usage using a cryptographic engine of the computing device; verifying, by the computing device, the hardware attestation information; securely enumerating, by the computing device, one or more dynamically attached hardware I/O components of the computing device in response to verifying the hardware attestation information; loading, by the computing device, one or more trusted software components in response to securely enumerating the one or more dynamically attached hardware I/O components; collecting, by the computing device, software attestation information associated with the trusted software components in response to loading the trusted software components, wherein the software attestation information is indicative of identity and topology of the trusted software components; and verifying, by the computing device, the software attestation information.

Example 27 includes the subject matter of Example 26, and wherein collecting the hardware attestation information comprises reading a platform manifest of the computing device, wherein the platform manifest is indicative of the statically attached hardware I/O components.

Example 28 includes the subject matter of any of Examples 26 and 27, and wherein verifying the hardware attestation information comprises verifying, by a trusted software component of the computing device, a cryptographic signature of the platform manifest.

Example 29 includes the subject matter of any of Examples 26-28, and wherein verifying the hardware attestation information further comprises: reading, by a trusted system agent of the computing device, a platform model identifier from an in-field programmable fuse of the computing device; securely transmitting, by the trusted system agent, the platform model identifier to the trusted software component; and comparing, by the trusted software component, the platform model identifier to a second platform model identifier of the platform manifest in response to verifying the cryptographic signature of the platform manifest.

Example 30 includes the subject matter of any of Examples 26-29, and wherein the trusted system agent comprises a converged security engine of the computing device.

Example 31 includes the subject matter of any of Examples 26-30, and wherein collecting the hardware attestation information associated with the one or more statically attached hardware I/O components comprises discovering, by a trusted system agent of the computing device, the statically attached hardware I/O components.

Example 32 includes the subject matter of any of Examples 26-31, and wherein the trusted system agent comprises a converged security engine of the computing device.

Example 33 includes the subject matter of any of Examples 26-32, and wherein collecting the software attestation information comprises generating one or more secure enclave reports, wherein each secure enclave report is indicative of a cryptographic measurement of a trusted software component.

Example 34 includes the subject matter of any of Examples 26-33, and wherein verifying the software attestation information comprises: determining one or more hardware I/O devices required by the trusted I/O usage; determining, based on the software attestation information, that each of the one or more hardware I/O devices required by the trusted I/O usage is reachable via a secure I/O path from a trusted application associated with the trusted I/O usage; and verifying an identity of each trusted software component associated with each secure I/O path.

Example 35 includes the subject matter of any of Examples 26-34, and wherein verifying the software attestation information comprises verifying the software attestation information by a trusted application of the computing device.

Example 36 includes the subject matter of any of Examples 26-35, and wherein verifying the software attestation information comprises submitting the software attestation information to a local verification service of the computing device.

Example 37 includes the subject matter of any of Examples 26-36, and wherein verifying the software attestation information comprises submitting the software attestation information to a remote verification service.

Example 38 includes the subject matter of any of Examples 26-37, and further comprising: collecting, by the computing device, firmware attestation information associated with one or more I/O controllers of the computing device; and verifying, by the computing device, the firmware attestation information.

Example 39 includes the subject matter of any of Examples 26-38, and wherein: collecting the firmware attestation information comprises collecting the firmware attestation information by a trusted system agent of the computing device; and verifying the firmware attestation information comprises verifying the firmware attestation information by the trusted system agent.

Example 40 includes the subject matter of any of Examples 26-39, and wherein collecting the firmware attestation information comprises collecting a cryptographic hash of firmware code associated with the one or more I/O controllers.

Example 41 includes the subject matter of any of Examples 26-40, and wherein the trusted system agent comprises a converged security engine of the computing device.

Example 42 includes the subject matter of any of Examples 26-41, and further comprising: collecting, by the computing device, application attestation information associated with a trusted application of the computing device, wherein the trusted application uses the trusted I/O usage; and verifying, by the computing device, the application attestation information.

Example 43 includes the subject matter of any of Examples 26-42, and wherein verifying the application attestation information comprises submitting the application attestation information to a remote verification service.

Example 44 includes the subject matter of any of Examples 26-43, and wherein collecting the application attestation information comprises collecting a secure enclave quote from the trusted application, wherein the secure enclave quote comprises a signed secure enclave report, and wherein the secure enclave report is indicative of a cryptographic measurement of the trusted application.

Example 45 includes the subject matter of any of Examples 26-44, and further comprising initializing one or more protected DMA channels associated with the trusted I/O usage.

Example 46 includes a method for generating a platform manifest, the method comprising: reading, by a computing device, a platform description indicative of hardware components of a target computing device; generating, by the computing device, a platform manifest based on the platform description, wherein the platform manifest is indicative of one or more hardware components of the target computing device that are capable of trusted I/O; and binding, by the computing device, the platform manifest to the target computing device.

Example 47 includes the subject matter of Example 46, and wherein reading the platform description comprises reading a platform firmware description table.

Example 48 includes the subject matter of any of Examples 46 and 47, and wherein generating the platform manifest comprises generating a platform manifest indicative of one or more statically attached I/O controllers of the target computing device that are capable of trusted I/O.

Example 49 includes the subject matter of any of Examples 46-48, and wherein binding the platform manifest to the target computing device comprises: burning a platform model identifier into an in-field programmable fuse of the target computing device; including the platform model identifier in the platform manifest; and cryptographically signing the platform manifest in response to including the platform model identifier in the platform manifest.

Example 50 includes the subject matter of any of Examples 46-49, and wherein the computing device comprises the target computing device.

Example 51 includes a computing device comprising: a processor; and a memory having stored therein a plurality of instructions that when executed by the processor cause the computing device to perform the method of any of Examples 26-50.

Example 52 includes one or more machine readable storage media comprising a plurality of instructions stored thereon that in response to being executed result in a computing device performing the method of any of Examples 26-50.

Example 53 includes a computing device comprising means for performing the method of any of Examples 26-50.

Example 54 includes a computing device for trusted I/O attestation and verification, the computing device comprising: means for collecting hardware attestation information associated with one or more statically attached hardware I/O components of the computing device, wherein the hardware I/O components are associated with a trusted I/O usage using a cryptographic engine of the computing device; means for verifying the hardware attestation information; means for securely enumerating one or more dynamically attached hardware I/O components of the computing device in response to verifying the hardware attestation information; means for loading one or more trusted software components in response to securely enumerating the one or more dynamically attached hardware I/O components; means for collecting software attestation information associated with the trusted software components in response to loading the trusted software components, wherein the software attestation information is indicative of identity and topology of the trusted software components; and means for verifying the software attestation information.

Example 55 includes the subject matter of Example 54, and wherein the means for collecting the hardware attestation information comprises means for reading a platform manifest of the computing device, wherein the platform manifest is indicative of the statically attached hardware I/O components.

Example 56 includes the subject matter of any of Examples 54 and 55, and wherein the means for verifying the hardware attestation information comprises means for verifying, by a trusted software component of the computing device, a cryptographic signature of the platform manifest.

Example 57 includes the subject matter of any of Examples 54-56, and wherein the means for verifying the hardware attestation information further comprises: means for reading, by a trusted system agent of the computing device, a platform model identifier from an in-field programmable fuse of the computing device; means for securely transmitting, by the trusted system agent, the platform model identifier to the trusted software component; and means for comparing, by the trusted software component, the platform model identifier to a second platform model identifier of the platform manifest in response to verifying the cryptographic signature of the platform manifest.

Example 58 includes the subject matter of any of Examples 54-57, and wherein the trusted system agent comprises a converged security engine of the computing device.

Example 59 includes the subject matter of any of Examples 54-58, and wherein the means for collecting the hardware attestation information associated with the one or more statically attached hardware I/O components comprises means for discovering, by a trusted system agent of the computing device, the statically attached hardware I/O components.

Example 60 includes the subject matter of any of Examples 54-59, and wherein the trusted system agent comprises a converged security engine of the computing device.

Example 61 includes the subject matter of any of Examples 54-60, and wherein the means for collecting the software attestation information comprises means for generating one or more secure enclave reports, wherein each secure enclave report is indicative of a cryptographic measurement of a trusted software component.

Example 62 includes the subject matter of any of Examples 54-61, and wherein the means for verifying the software attestation information comprises: means for determining one or more hardware I/O devices required by the trusted I/O usage; means for determining, based on the software attestation information, that each of the one or more hardware I/O devices required by the trusted I/O usage is reachable via a secure I/O path from a trusted application associated with the trusted I/O usage; and means for verifying an identity of each trusted software component associated with each secure I/O path.

Example 63 includes the subject matter of any of Examples 54-62, and wherein the means for verifying the software attestation information comprises means for verifying the software attestation information by a trusted application of the computing device.

Example 64 includes the subject matter of any of Examples 54-63, and wherein the means for verifying the software attestation information comprises means for submitting the software attestation information to a local verification service of the computing device.

Example 65 includes the subject matter of any of Examples 54-64, and wherein the means for verifying the software attestation information comprises means for submitting the software attestation information to a remote verification service.

Example 66 includes the subject matter of any of Examples 54-65, and further comprising: means for collecting firmware attestation information associated with one or more I/O controllers of the computing device; and means for verifying the firmware attestation information.

Example 67 includes the subject matter of any of Examples 54-66, and wherein: the means for collecting the firmware attestation information comprises means for collecting the firmware attestation information by a trusted system agent of the computing device; and the means for verifying the firmware attestation information comprises means for verifying the firmware attestation information by the trusted system agent.

Example 68 includes the subject matter of any of Examples 54-67, and wherein the means for collecting the firmware attestation information comprises means for collecting a cryptographic hash of firmware code associated with the one or more I/O controllers.

Example 69 includes the subject matter of any of Examples 54-68, and wherein the trusted system agent comprises a converged security engine of the computing device.

Example 70 includes the subject matter of any of Examples 54-69, and further comprising: means for collecting application attestation information associated with a trusted application of the computing device, wherein the trusted application uses the trusted I/O usage; and means for verifying the application attestation information.

Example 71 includes the subject matter of any of Examples 54-70, and wherein the means for verifying the application attestation information comprises means for submitting the application attestation information to a remote verification service.

Example 72 includes the subject matter of any of Examples 54-71, and wherein the means for collecting the application attestation information comprises means for collecting a secure enclave quote from the trusted application, wherein the secure enclave quote comprises a signed secure enclave report, and wherein the secure enclave report is indicative of a cryptographic measurement of the trusted application.

Example 73 includes the subject matter of any of Examples 54-72, and further comprising means for initializing one or more protected DMA channels associated with the trusted I/O usage.

Example 74 includes a computing device for generating a platform manifest, the computing device comprising: means for reading a platform description indicative of hardware components of a target computing device; means for generating a platform manifest based on the platform description, wherein the platform manifest is indicative of one or more hardware components of the target computing device that are capable of trusted I/O; and means for binding the platform manifest to the target computing device.

Example 75 includes the subject matter of Example 74, and wherein the means for reading the platform description comprises means for reading a platform firmware description table.

Example 76 includes the subject matter of any of Examples 74 and 75, and wherein the means for generating the platform manifest comprises means for generating a platform manifest indicative of one or more statically attached I/O controllers of the target computing device that are capable of trusted I/O.

Example 77 includes the subject matter of any of Examples 74-76, and wherein the means for binding the platform manifest to the target computing device comprises: means for burning a platform model identifier into an in-field programmable fuse of the target computing device; means for including the platform model identifier in the platform manifest; and means for cryptographically signing the platform manifest in response to including the platform model identifier in the platform manifest.

Example 78 includes the subject matter of any of Examples 74-77, and wherein the computing device comprises the target computing device.

The invention claimed is:

1. An apparatus, comprising:
an application processor;
a memory;
an input/output (I/O) subsystem communicatively coupled to the processor and the memory;
a cryptographic engine to secure one or more direct memory access (DMA) channels;
a secure, fused memory to store persistently a first platform device identifier associated with the apparatus; and
a security subsystem, comprising a secure processing element to:
collect attestation information of one or more hardware or software components of the apparatus;
send the attestation information to a remote verification service;
securely enumerate one or more dynamically attached hardware I/O components in response to a verification of the hardware I/O components by the remote verification service;
load a secure bus enumerator for the one or more dynamically attached hardware I/O components; and
initialize one or more protected direct memory access (DMA) channels associated with a trusted I/O usage of the security subsystem and protected by the cryptographic engine.

2. The apparatus of claim 1, the secure processing element to:
discover one or more statically attached hardware I/O components.

3. The apparatus of claim 2, the secure processing element to:
generate one or more secure enclave reports, wherein each secure enclave report is indicative of a cryptographic measurement of a trusted software component.

4. The apparatus of claim 1, the secure processing element to:
determine one or more hardware I/O devices of the I/O subsystem;
determine, based on the attestation information, that the one or more hardware I/O devices required is reachable via a secure I/O path from a trusted application associated with the I/O subsystem; and
verify an identity of a trusted software component associated with the secure I/O path.

5. The apparatus of claim 1, the secure processing element to:
verify at least a portion of the attestation information by a trusted application executing on the apparatus.

6. The apparatus of claim 5, further comprising a firmware attestation module, executed by the secure processing element, to (i) collect firmware attestation information associated with one or more I/O controllers of the apparatus, and (ii) verify the firmware attestation information.

7. The apparatus of claim 1, further comprising an application attestation module, executed by the secure processing element, to (i) collect application attestation information associated with a trusted application of the apparatus, wherein the trusted application uses a trusted I/O usage, and (ii) verify the application attestation information.

* * * * *